(12) United States Patent
Baillon et al.

(10) Patent No.: US 7,352,476 B2
(45) Date of Patent: Apr. 1, 2008

(54) DEVICE FOR DETECTING ATMOSPHERIC TURBULENCE

(75) Inventors: Bertrand Baillon, Valence (FR); Laurence Mutuel, Saint Vincent la Commanderie (FR); Jean-Pierre Schlotterbeck, Rochefort-Samson (FR)

(73) Assignee: Thales (FR)

( * ) Notice: Subject to any disclaimer, the term of this patent is extended or adjusted under 35 U.S.C. 154(b) by 265 days.

(21) Appl. No.: 11/313,663

(22) Filed: Dec. 22, 2005

(65) Prior Publication Data
US 2006/0139657 A1 Jun. 29, 2006

(30) Foreign Application Priority Data
Dec. 23, 2004 (FR) .................................. 04 13836

(51) Int. Cl.
*G01B 9/02* (2006.01)

(52) U.S. Cl. ................................................ 356/519
(58) Field of Classification Search ................ 356/454, 356/480, 519
See application file for complete search history.

(56) References Cited

U.S. PATENT DOCUMENTS 4,482,247 A * 11/1984 Meltz et al. ................ 356/343
6,088,103 A * 7/2000 Everett et al. .............. 356/503
6,307,626 B1 * 10/2001 Miles et al. ................. 356/301
2004/0042001 A1 * 3/2004 Vaez-Iravani et al. ... 356/237.2
2004/0233410 A1 * 11/2004 Shiraishi ....................... 355/67
2004/0233411 A1 * 11/2004 Shiraishi ....................... 355/67
2006/0197946 A1 * 9/2006 Biellak et al. ............ 356/237.4

* cited by examiner

Primary Examiner—Patrick Connolly
(74) Attorney, Agent, or Firm—Lowe Hauptman Ham & Berner, LLP

(57) ABSTRACT

The invention relates to a device for remote measurement of the properties of the atmosphere, more particularly a device used to detect atmospheric turbulence. The device operates on the lidar principle, using the backscattering of a laser beam by the air. The device comprises a laser emission source (1), optical means (5) for collecting a backscattered beam (3) that is backscattered by targets illuminated by the emission source (1), the backscattered beam (3) being substantially centerd about the wavelength of the emission source (1), and means (9) for generating interference fringes (24) resulting from the backscattered beam (3). The device also includes a spatial filter (11) allowing only a central spot of the interference fringes to be seen and, at the center of the spatial filter (11), a mask for blocking off the center of the central spot and more particularly the Mie line of the backscattered beam.

8 Claims, 7 Drawing Sheets

DEVICE FOR DETECTING ATMOSPHERIC TURBULENCE

BACKGROUND OF THE INVENTION

The invention relates to a device for remote measurement of the properties of the atmosphere, more particularly a device used to detect atmospheric turbulence. The device operates on the lidar principle, using the backscattering of a laser beam by the air. The device employs a laser source, in general a pulsed laser source. The propagation of the laser pulses is tracked from receiving a fraction of the radiation re-emitted either by aerosols suspended in the atmosphere or by the air molecules of the atmosphere. Of particular interest is the reception of wavelengths very close to the wavelength of the laser source. The backscattered radiation is analyzed by interferometry. Two types of diffusion are observed. A first type, usually called Mie scattering, is scattering by aerosol particles in suspension in the atmosphere. These particles move at the speed of the wind present in the observation region in such a way that the backscattered wavelength is Doppler-shifted relative to the wavelength of the laser source by an amount corresponding to the wind speed. A second type, commonly called Rayleigh scattering, is scattering by the molecules of the air. The natural movement of the molecules generates a scattering effect, the spectral width of which is broader than that of the particles suspended in the atmosphere, but the Rayleigh line always remains centred on the Mie line. On passing through an interferometer, the two lines (Mie and Rayleigh) are superimposed and it is difficult to separate them without using sophisticated equipment, which equipment is generally reserved for studies carried out in the laboratory. The aim of the invention is to separate the Mie and Rayleigh lines in a simple manner.

The invention is particularly useful in aeronautical equipment. Aircraft are sensitive to atmospheric turbulence but it is difficult, at the present time, to anticipate the entry of an aircraft into a region of turbulence, which may generate large mechanical stresses on the structure of the aircraft and/or may injure, quite seriously, passengers and crew members not attached thereto.

Atmospheric turbulence can be detected, at the front of the aircraft, by means of a lidar, by measuring the Rayleigh line in order to detect density and temperature variations in the air. However, the presence of aerosols, and in particular the fluctuation in the density of the aerosols, disturbs the measurement because of a Mie line of variable intensity that is superimposed on the Rayleigh line.

SUMMARY OF THE INVENTION

The object of the invention is to carry out a measurement of the Rayleigh line by blocking off the Mie line in a simple manner. A device according to the invention can be easily mounted on board an aircraft.

For this purpose, the subject of the invention is a device for detecting atmospheric turbulence, comprising a laser emission source, optical means for collecting a backscattered beam that is backscattered by targets illuminated by the emission source, the backscattered beam being substantially centred about the wavelength of the emission source, and means for generating interference fringes resulting from the backscattered beam, characterized in that it includes a spatial filter allowing only a central spot of the interference fringes to be seen and, at the centre of the spatial filter, a mask for blocking off the centre of the central spot.

BRIEF DESCRIPTION OF THE DRAWING

The invention will be more clearly understood and further advantages will become apparent on reading the detailed description of an exemplary embodiment, the description being illustrated by the appended drawing in which.

For the sake of simplicity, the same elements in the various figures will bear the same reference numbers.

DETAILED DESCRIPTION OF THE PREFERRED EMBODIMENT

Figure 1:
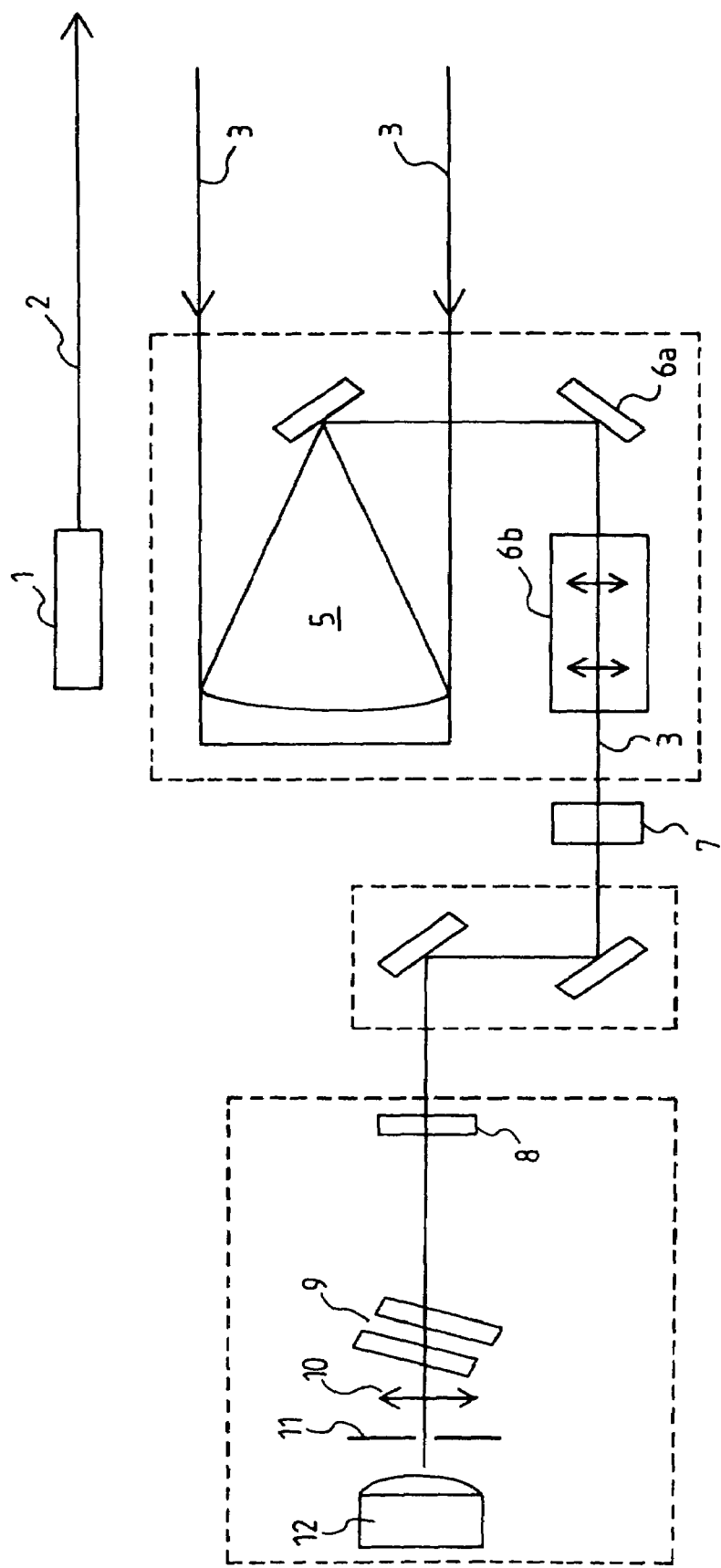
FIG. 1 shows schematically a device according to the invention for detecting atmospheric turbulence.

FIG. 1 shows a device for detecting atmospheric turbulence. The device comprises a laser emission source 1, advantageously a pulsed laser emission source, which emits a beam 2 in a first direction. The beam 2 is backscattered by air molecules and by aerosols in suspension in the atmosphere. The beam backscattered by the targets illuminated by the laser emission source 1 bears the reference 3. The device includes optical means 4 for collecting the backscattered beam 3. These optical means comprise, for example, a collecting telescope 5 and optical means 6a and 6b for shaping the beam 3. Along the path of the beam 3, on the exit side of the optical means 6a and 6b, may be inserted a mechanical shutter 7, for interrupting the passage of the beam 3, and a solar filter 8, for eliminating any solar radiation lying outside the useful spectral band and collected, with the backscattered beam 3, by the telescope 5. For example, a laser emission source 1 is used that emits a beam with a wavelength of 355 nm, and, thanks to the solar filter, this allows the device to operate in broad daylight.

The device further includes means 9 for generating interference fringes from the backscattered radiation 3, a focussing lens 10, a spatial filter 11 and a detector 12 for measuring the intensity of a beam passing through the spatial filter 11. The means 9 for generating interference fringes comprise for example a Fabry-Perot interference filter.

The mechanical shutter 7 protects the components 9 to 12 from unwanted dazzling outside the measurement periods. The detector 12 is therefore controlled in synchronism with the pulses of the source 1 in order to make a measurement over a given distance range.

Figure 2:
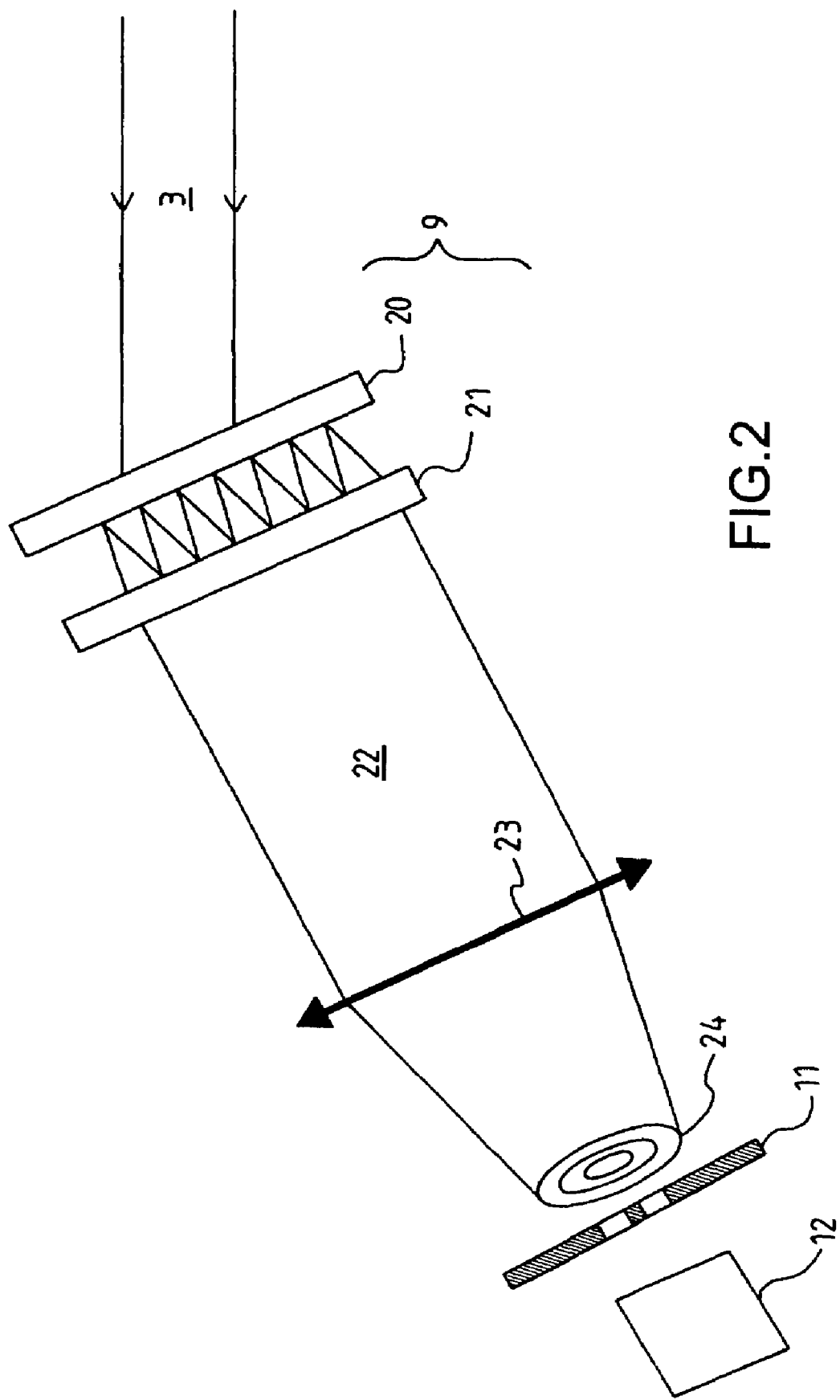
FIG. 2 shows in greater detail the path of a beam passing through the means for generating interference fringes and a spatial filter.

FIG. 2 shows in greater detail the path of a beam passing through the means 9 for generating interference fringes and the spatial filter 11. The means 9 advantageously comprise a Fabry-Perot interference filter. The backscattered beam 3 enters the interference filter, which comprises two parallel mirrors 20 and 21. A beam 22 exiting the interference filter is focussed by a lens 23 so as to form interference fringes 24. The spatial filter 11 is inserted between the lens 23 and the detector 12.

Figure 3:
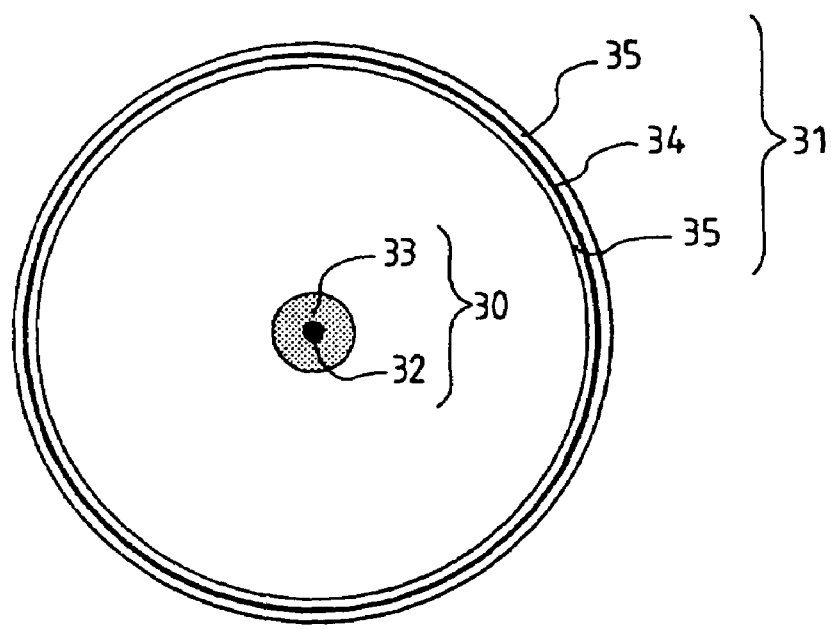
FIG. 3 shows, in top view, the first interference fringes in the absence of the spatial filter.

FIG. 3 shows, in top view, the first interference fringes in the absence of the spatial filter 11. The fringes form concentric rings around a central spot 30. In FIG. 3, only the central spot 30 and the first ring 31 have been shown. The central spot 30 forms the highest-order fringe and the first ring 31 forms the fringe of a lower order with respect to the central spot 30. The Mie line forms a region 32 of high intensity at the centre of the central spot. The Rayleigh line forms a region 33 of lower intensity around the periphery of the region 32. Likewise, the Mie line forms a region 34 of high intensity at the centre of the ring 31 and the Rayleigh line forms a region 35 of lower intensity surrounding the region 34.

Advantageously, the means for generating interference fringes comprise a servomechanism that allows the central spot 30 to have no surplus fractional orders. Thus, the Mie line is right at the centre of the central spot 30.

When a Fabry-Perot interference filter is used, the servomechanism controls the position of one of the mirrors 20 or 21 or the position of both mirrors 20 and 21 of the interference filter 9, for example by means of a piezoelectric device.

Figure 4:
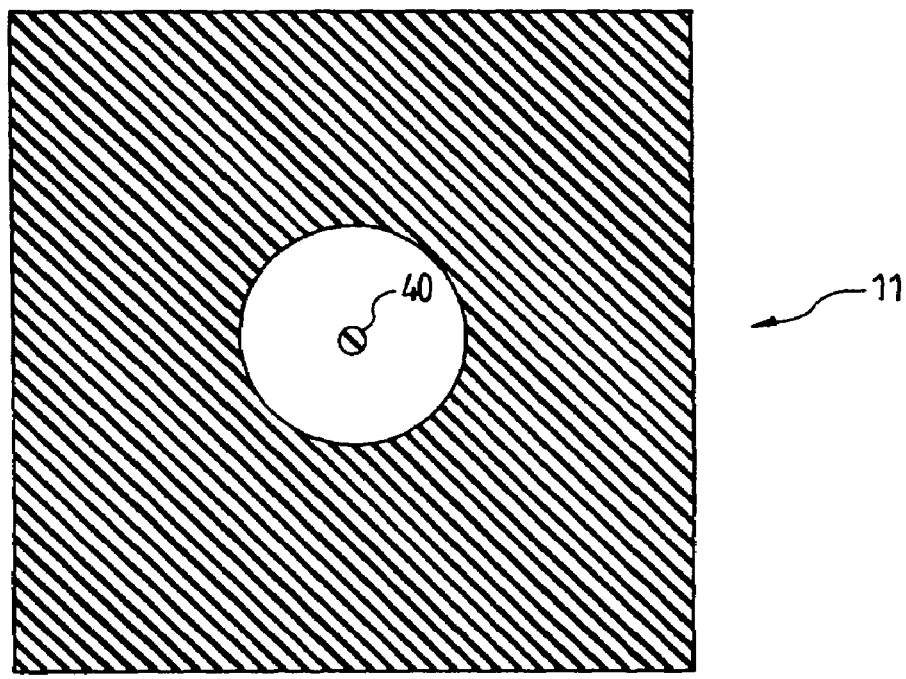
FIG. 4 shows the spatial filter in top view.

FIG. 4 shows the spatial filter 11 in top view. The spatial filter 11 allows only the central spot 30 to be seen. The spatial filter 11 masks all the rings of lower order with respect to the central spot 30. In particular, the spatial filter 11 masks the ring 31. The spatial filter 11 includes a mask 40 for blocking off the centre of the central spot 30, and more precisely the mask 40 blocks off the Mie line appearing in the central spot 30.

Figures 5, 6, 7:
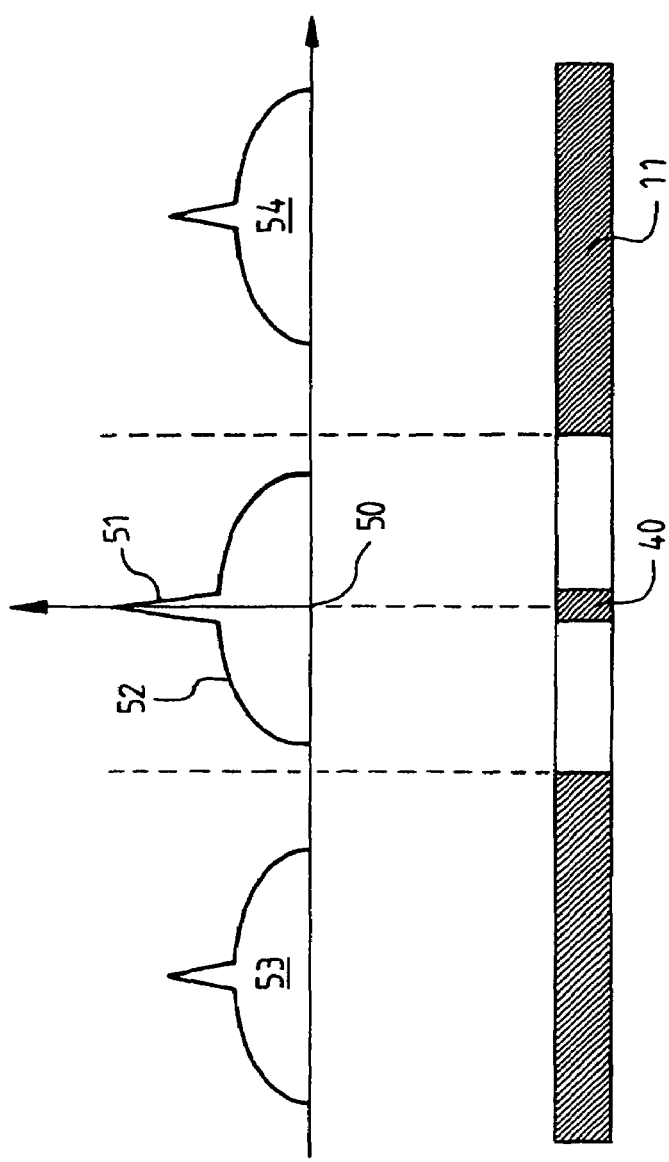
FIG. 5 shows the intensity of the first interference fringes in the absence of the spatial filter.
FIG. 6 shows the spatial filter in side view.
FIG. 7 shows the intensity of the first interference fringe after masking by the spatial filter and as a function of the displacement of the spatial filter.

FIG. 5 shows the intensity of the first interference fringes in the absence of the spatial filter 11. The intensity is shown as a curve plotted with respect to a coordinate system in which the x-axis gives the position of the fringe along an axis passing through the centre 50 of the central spot 30. The y-axis of the coordinate system gives the value of the intensity. The origin of the x-axis is defined for the intensity at the centre 50. Since the interference fringes are symmetrical about their centre 50, the curve representing the intensity is also symmetrical with respect to the y-axis. The intensity of the region 32 forming the Mie line of the central spot 30 forms a peak 51 lying around the y-axis. The intensity of the region 33 forming the Rayleigh line of the central spot 30 has a more spread-out shape 52 than the peak 51 and is of lower intensity. The intensity of the ring 31 is represented by two curves 53 and 54 similar to that representing the intensity of the central spot 30. The two curves 53 and 54 are also symmetrical with respect to the y-axis.

FIG. 6 shows in a simplified manner the spatial filter 11 in side view. The spatial filter blocks off the curves 53 and 54 and the mask 40 blocks off the peak 51.

The device advantageously includes means for displacing the spatial filter 11 and its mask 40 in a direction approximately perpendicular to the beam coming from the means 9 for generating interference fringes. FIG. 7 illustrates the variation in light intensity of the beam passing through the spatial filter 11 when this is displaced.

The intensity is plotted on the y-axis and the displacement on the x-axis. This curve is symmetrical with respect to a centred position of the spatial filter 11 with respect to the interference rings. This centred position is that of the origin of the x-axis.

Figure 8A:
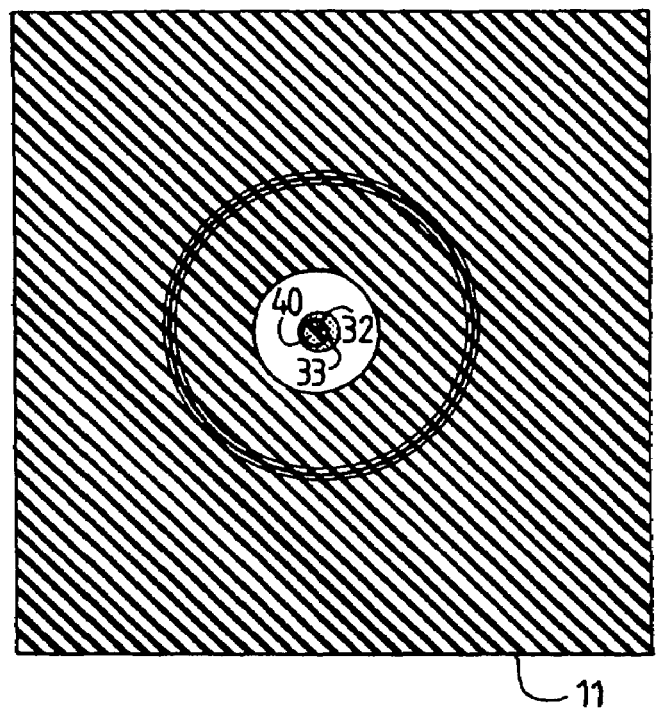
FIGS. 8a to 8e show, in top view, the masking of the first interference fringe as a function of the position of the spatial filter.
Figure 8B:
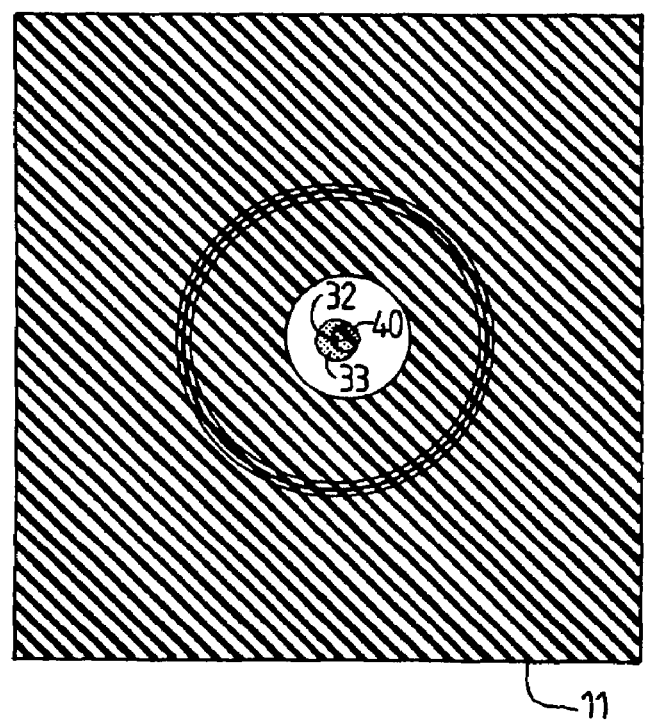
Figure 8C:
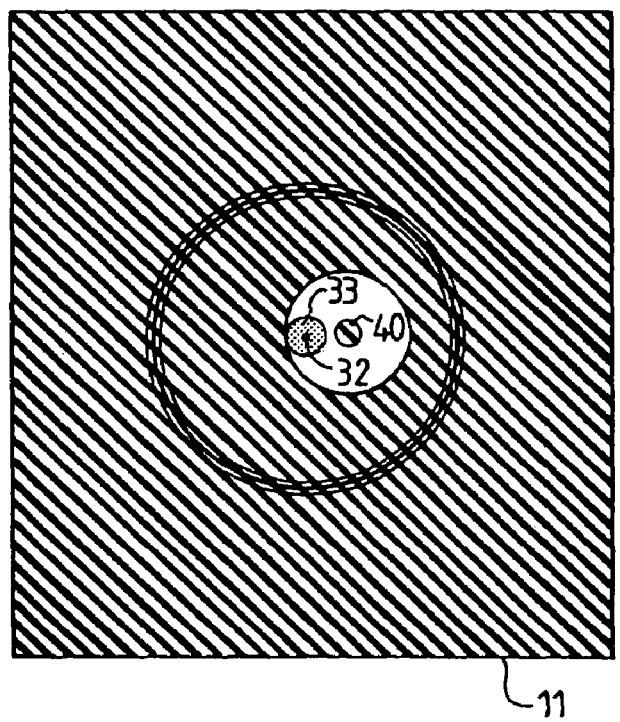
Figure 8D:
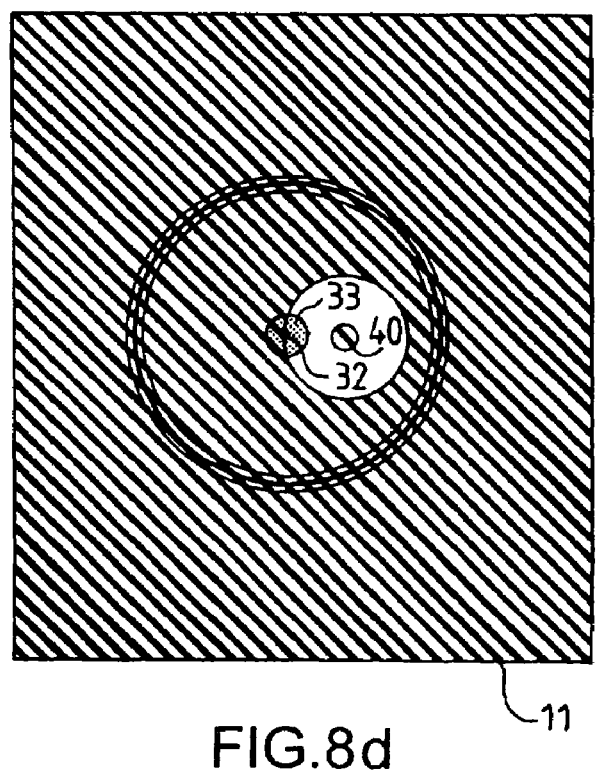
Figure 8E:
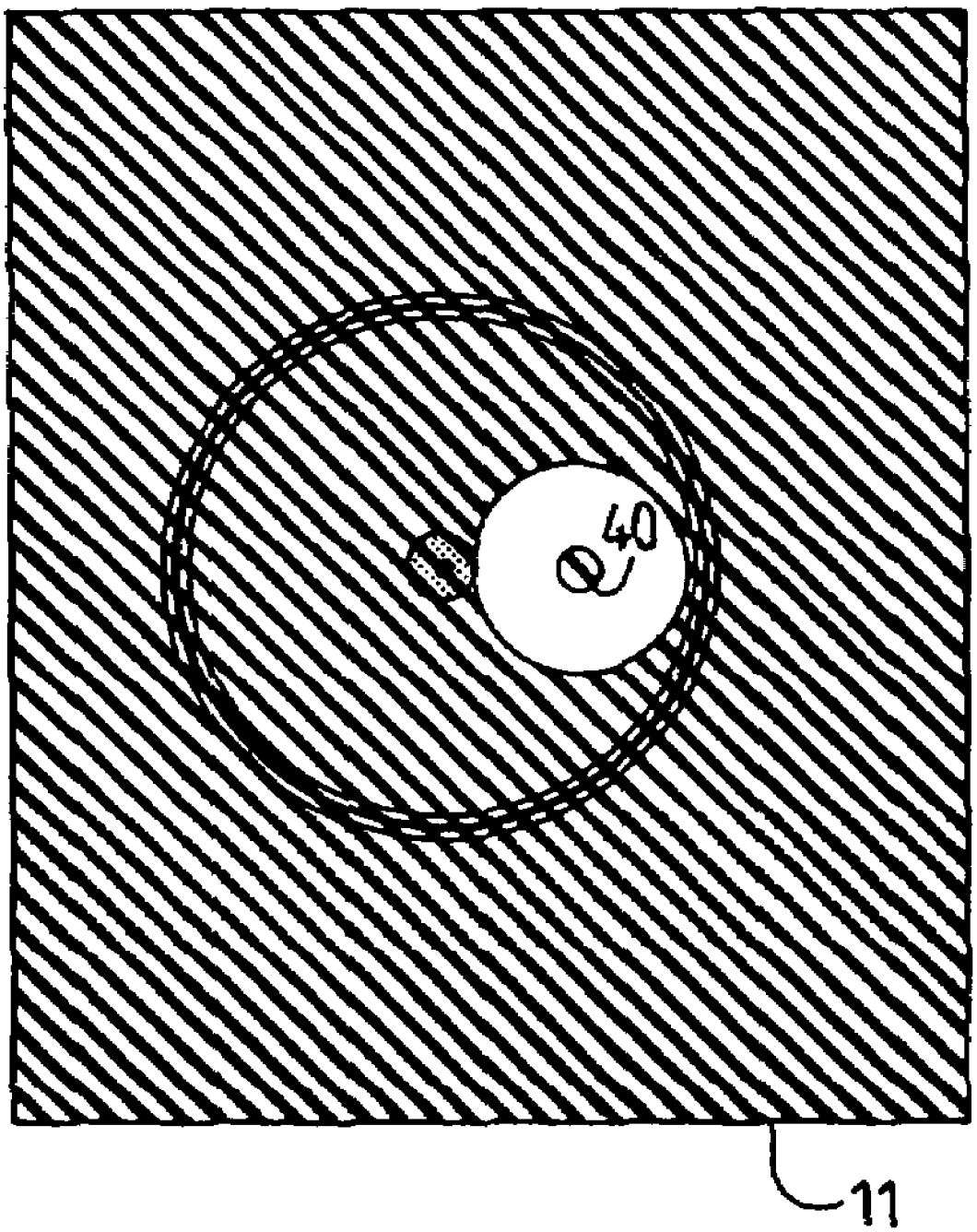

FIGS. 8a to 8e show, in top view, various positions of the spatial filter 11 and of its mask 40 with respect to the interference fringes. In FIG. 8a, the mask 40 of the spatial filter 11 blocks off the Mie line of the central spot 30. The intensity received by the detector 12 is that of the Rayleigh line of the central spot 30. The corresponding intensity 70 passes through a minimum as long as the Mie line is blocked off. The intensity 70 is plotted in FIG. 7. When the spatial filter 11 takes the position shown in FIG. 8b, by being moved away from its central position, the Mie line appears and the intensity received by the detector 12 increases. The intensity corresponding to the position shown in FIG. 8b has the reference number 71 in FIG. 7. When the filter is moved further away from the centred position, the central spot 30 appears completely, as shown in FIG. 8c, and the intensity, with the reference number 72 in FIG. 7, is a maximum. The Mie and Rayleigh lines are both detected by the detector 12. When the spatial filter 11 is moved even further away from its centred position, taking the position shown in FIG. 8d, the intensity, with the reference number 73 in FIG. 7, decreases before attaining almost extinction, with the reference number 74 in FIG. 7, of the beam passing through the spatial filter 11 when none of the interference fringes are detected by the detector, as shown in FIG. 8e. The detector 12 measures the overall intensity of the beam passing through the spatial filter 11. The detector comprises, for example, a simple photodiode sensitive to radiation at the wavelength of the laser emission source 1.

By displacing the spatial filter 11 it is possible to measure the intensity of the Rayleigh line, from the intensity 70, and also the spectral width of the Rayleigh line, from the position of the spatial filter 11 giving the intensity 73. It is also possible to determine the intensity of the Mie line, from the intensity 72, and the spectral width of the Mie line, from the position of the spatial filter 11 giving the intensity 71.

The invention claimed is:

1. A device for detecting atmospheric turbulence, comprising a laser emission source, optical means for collecting a backscattered beam that is backscattered by targets illuminated by the emission source, the backscattered beam being substantially centred about the wavelength of the emission source, and means for generating interference fringes resulting from the backscattered beam, a spatial filter allowing only a central spot of the interference fringes to be seen and, at the centre of the spatial filter, a mask for blocking off the centre of the central spot.

2. The device as claimed in claim 1, wherein the mask blocks off the Mie line of the collected beam.

3. The device as claimed in claim 1, wherein the means for generating interference fringes comprise a Fabry-Perot interference filter.

4. The device as claimed in claim 1, wherein the means for generating interference fringes comprise a servomechanism that allows the central spot to have no surplus fractional orders.

5. The Device as claimed in claim 3, wherein the servomechanism controls the position of one of the mirrors or the position of both mirrors of the interference filter.

6. The device as claimed in claim 1, wherein it includes means for measuring the intensity of a beam passing through the spatial filter.

7. The device as claimed in claim 1, wherein it includes means for displacing the spatial filter and the mask in a direction approximately perpendicular to the beam coming from the means for generating interference fringes.

8. The device as claimed in claim 4, wherein the servomechanism controls the position of one of the mirrors or the position of both mirrors of the interference filter.

* * * * *